(12) United States Patent
Kakiyama et al.

(10) Patent No.: US 12,465,893 B2
(45) Date of Patent: Nov. 11, 2025

(54) GAS SEPARATION MEMBRANE, GAS SEPARATION MEMBRANE MODULE, AND PRODUCTION METHOD FOR GAS SEPARATION MEMBRANE

(71) Applicant: Toray Industries, Inc., Tokyo (JP)

(72) Inventors: So Kakiyama, Otsu (JP); Takaaki Mihara, Otsu (JP)

(73) Assignee: Toray Industries, Inc., Tokyo (JP)

( * ) Notice: Subject to any disclaimer, the term of this patent is extended or adjusted under 35 U.S.C. 154(b) by 383 days.

(21) Appl. No.: 18/004,074

(22) PCT Filed: Jul. 13, 2021

(86) PCT No.: PCT/JP2021/026228
§ 371 (c)(1),
(2) Date: Jan. 3, 2023

(87) PCT Pub. No.: WO2022/030196
PCT Pub. Date: Feb. 10, 2022

(65) Prior Publication Data
US 2023/0264152 A1 Aug. 24, 2023

(30) Foreign Application Priority Data
Aug. 3, 2020 (JP) ................................. 2020-131463

(51) Int. Cl.
*B01D 71/02* (2006.01)
*B01D 53/22* (2006.01)
(Continued)

(52) U.S. Cl.
CPC ....... *B01D 71/0213* (2022.08); *B01D 53/228* (2013.01); *B01D 67/0079* (2013.01);
(Continued)

(58) Field of Classification Search
CPC ....... B01D 69/12; B01D 71/70; B01D 71/028
See application file for complete search history.

(56) References Cited

U.S. PATENT DOCUMENTS 12,115,504 B2 * 10/2024 Yamashita ......... B01D 71/0211
2012/0310018 A1 12/2012 Lai et al.
(Continued)

FOREIGN PATENT DOCUMENTS

JP 2010115610 A 5/2010
JP 2014-79712 5/2014
(Continued)

OTHER PUBLICATIONS

International Search Report dated Sep. 7, 2021, of corresponding International Application No. PCT/JP2021/026228, along with an English translation.
(Continued)

*Primary Examiner* — Sharon Pregler
(74) *Attorney, Agent, or Firm* — DLA Piper LLP (US)

(57) ABSTRACT

A gas separation membrane includes a composite membrane, the composite membrane including: a gas separation functional layer; and a compound having a composition different from a compound constituting the gas separation functional layer, wherein the presence ratio of the gas separation functional layer at at least one surface of the gas separation membrane is not less than 90% and less than 100%. Provided is a gas separation membrane capable of suppressing damage of the gas separation functional layer during the preparation process of a gas separation membrane module or during the use of a gas separation membrane module even when the gas separation functional layer includes a site having low strength.

12 Claims, 3 Drawing Sheets

(51) Int. Cl.
   *B01D 67/00* (2006.01)
   *B01D 69/08* (2006.01)
   *B01D 69/12* (2006.01)
   *B01D 71/54* (2006.01)
   *B01D 71/70* (2006.01)

(52) U.S. Cl.
   CPC ......... *B01D 69/08* (2013.01); *B01D 69/1213* (2022.08); *B01D 71/021* (2013.01); *B01D 71/027* (2013.01); *B01D 71/028* (2013.01); *B01D 71/54* (2013.01); *B01D 71/70* (2013.01); *B01D 2053/224* (2013.01)

(56) References Cited

U.S. PATENT DOCUMENTS

| | | |
|---|---|---|
| 2015/0151242 A1 | 6/2015 | Nagano et al. |
| 2016/0310911 A1 | 10/2016 | Nagal et al. |
| 2021/0362097 A1 | 11/2021 | Yamashita et al. |
| 2022/0080365 A1 | 3/2022 | Yamashita et al. |

FOREIGN PATENT DOCUMENTS

| | | |
|---|---|---|
| JP | 2015-150474 | 8/2015 |
| JP | 2017170435 A | 9/2017 |
| JP | 2018-27520 | 2/2018 |
| JP | 2019-42636 | 3/2019 |
| WO | 2014/007140 | 1/2014 |
| WO | 2019/235315 | 12/2019 |
| WO | 2020149352 A1 | 7/2020 |

OTHER PUBLICATIONS

Notice of Reasons for Refusal issued May 20, 2025, from counterpart Japanese Patent Application No. 2021-542117.

Office Action dated Sep. 9, 2025, from counterpart Japanese Patent Application No. 2021542117.

* cited by examiner

GAS SEPARATION MEMBRANE, GAS SEPARATION MEMBRANE MODULE, AND PRODUCTION METHOD FOR GAS SEPARATION MEMBRANE

TECHNICAL FIELD

This disclosure relates to a gas separation membrane, a gas separation membrane module, and a method of producing a gas separation membrane.

BACKGROUND

As a method of selectively separating and purifying a specific gas component from a mixture containing a plurality of gas components, the membrane separation method is known. Since the membrane separation method utilizes the pressure difference, the method is capable of saving energy consumption compared to other separation and purification methods, which is advantageous.

A gas separation membrane used in the membrane separation method comprises: a gas separation functional layer whose permeability to a specific gas component (permeating gas) is higher than its permeabilities to other gas components (non-permeating gases); and a permeation layer that does not substantially contribute to the gas separation (including a channel and a support).

The performance of a gas separation membrane is represented by the permeability to the permeating gas, and the gas permeation selectivity, which is the ratio between the permeabilities to the permeating gas and the non-permeating gases. As the permeability to the permeating gas and the gas permeation selectivity increase, the membrane separation efficiency increases.

In general, permeability of a permeating gas increases as the thickness of the separation functional layer decreases. On the other hand, as the thickness of the separation functional layer decreases, the strength of the separation functional layer decreases. Therefore, for the purpose of achieving both the permeability to the permeating gas and the strength of the gas separation functional layer, a mode in which the gas separation functional layer is placed on a support is commonly employed (see, for example, JP 2015-150474 A).

Further, the gas separation membrane is filled into a separated space, to be used as a gas separation membrane module. Regarding when the gas separation membrane is a hollow fiber membrane, its use as a hollow fiber membrane module in which a plurality of hollow fiber membranes are placed is known. Regarding when the gas separation membrane is a flat membrane, its use as a spiral-type module in which a gas separation membrane having a flat-membrane shape is wound around a central pipe is known.

JP 2015-150474 A discloses an example of a gas separation composite membrane comprising, on the upper side of a gas-permeable support, a gas separation functional layer containing a polyimide compound. However, since the support only has a function to support the gas separation functional layer, when there is a site having low strength in the gas separation functional layer on the support, the site having low strength in the gas separation functional layer may be broken or detached from the support during the preparation process of the gas separation membrane module or during the use of the gas separation membrane module. The occurrence of the breakage or detachment of the gas separation functional layer allows permeation of non-permeating gases through the broken site or detached site, resulting in a remarkable decrease in the gas permeation selectivity of the gas separation membrane.

It could therefore be helpful to provide a gas separation membrane capable of suppressing breakage of the gas separation functional layer during the preparation process of the gas separation membrane module or during the use of the gas separation membrane module, without deteriorating the permeability to the permeating gas.

SUMMARY

We thus provide a gas separation membrane:
comprising a composite membrane, the composite membrane comprising:
a gas separation functional layer; and
a compound ("composite compound") different from a compound constituting the gas separation functional layer,
wherein the presence ratio of the gas separation functional layer at at least one surface of the gas separation membrane is not less than 90% and less than 100%.

The gas separation membrane module has the following constitution:
a gas separation membrane module in which the gas separation membrane is placed, wherein the distance between vicinal composite membranes is 10 µm to 2,000 µm.

The method of producing a gas separation membrane:
comprising a composite membrane, the composite membrane comprising:
a gas separation functional layer; and
a compound (composite compound) different from a compound constituting the gas separation functional layer,
the method comprising
passing a gas or solution as a substrate of the composite compound, into a space separated by a membrane comprising the gas separation functional layer (uncombined membrane); and
passing a gas that cures the gas or solution as the substrate of the composite compound, into the other space separated by the uncombined membrane.

Preferably, in the gas separation membrane, the composite membrane is placed on at least one surface (surface A) of the gas separation membrane; a support is placed on the other surface (surface B); and the presence ratio of the gas separation functional layer on the surface A is not less than 90.0% and less than 100%.

Preferably, in the gas separation membrane, the support is a porous support.

Preferably, the gas separation membrane is a hollow fiber membrane, and the inner diameter of the composite membrane is 10 µm to 2,000 µm.

Preferably, in the gas separation membrane, the size of at least part of the composite compound is 0.1 µm to 100 µm on the surface of the gas separation membrane.

Preferably, in the gas separation membrane, a compound constituting the gas separation functional layer is a polymer compound, and the composite compound is an inorganic compound.

Preferably, in the gas separation membrane, a compound constituting the gas separation functional layer is an inorganic compound, and the composite compound is an organic compound.

Preferably, in the gas separation membrane, the composite compound is one or more compounds selected from the group consisting of silica, phenolic resins, and urethane resins.

Preferably, in the gas separation membrane, the thickness of the gas separation functional layer is 0.01 μm to 10 μm.

Our gas separation membrane is capable of suppressing damage of the gas separation functional layer during the preparation process of the gas separation membrane module or during the use of the gas separation membrane module, without deteriorating the permeability to the permeating gas.

DESCRIPTION OF SYMBOLS

Figure 1:
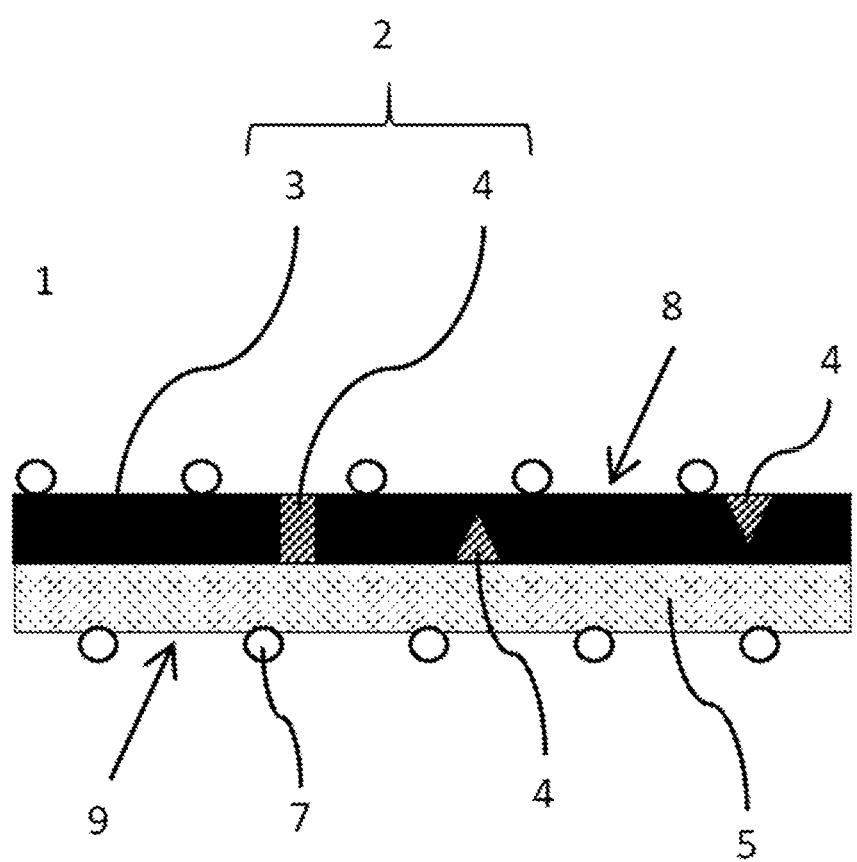
FIG. 1 is a schematic diagram illustrating a cross section of one mode of the gas separation membrane.

1: Gas separation membrane
2: Composite membrane
3: Gas separation functional layer
4: Composite compound
5: Support
6: Hollow portion of hollow fiber membrane
7: Spacer
8: Surface A
9: Surface B
11: Potting site
12: Adapter
13: Vessel
14: Inlet
15: Outlet
16: Element casing
17: Gas separation membrane element
18: Cap

DETAILED DESCRIPTION

Our gas separation membrane is a gas separation membrane comprising a composite membrane, which gas separation membrane is used for selectively separating and purifying a specific component from a mixed gas, the composite membrane comprising: a gas separation functional layer; and a compound (composite compound) different from a compound constituting the gas separation functional layer, wherein the presence ratio of the gas separation functional layer at at least one surface of the gas separation membrane is not less than 90% and less than 100%.

Figure 2:
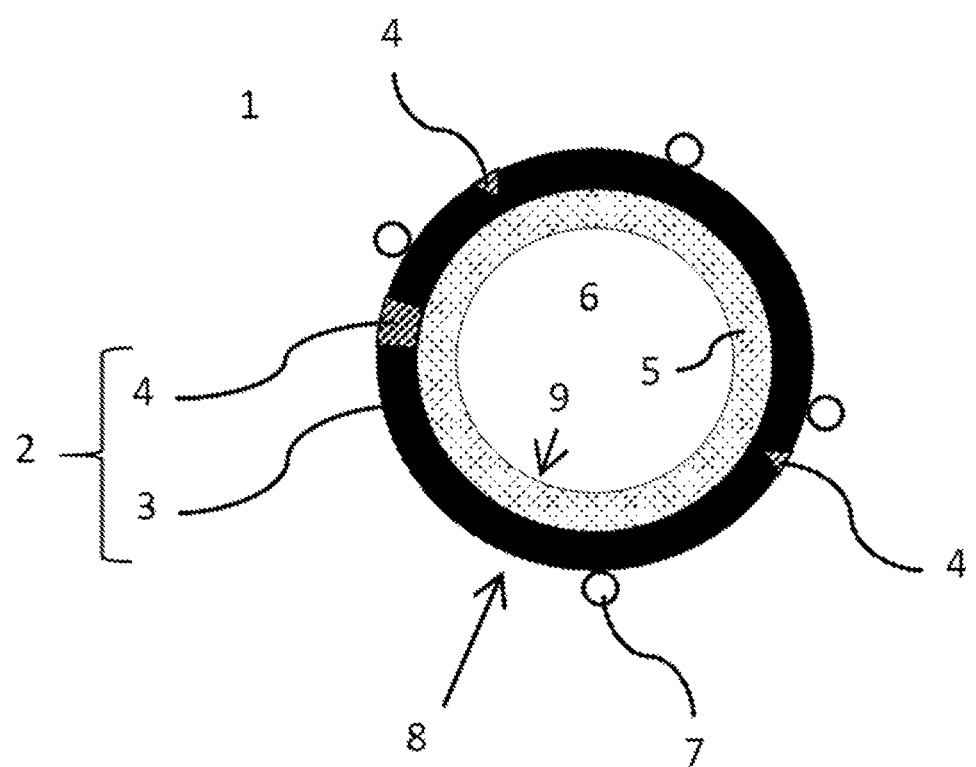
FIG. 2 is a schematic diagram illustrating a cross section of one mode of the gas separation membrane.

Each of FIGS. 1 and 2 shows a schematic diagram of one mode of the gas separation membrane. The gas separation membrane is described below using these.

The gas separation membrane comprises at least a composite membrane, and also comprises a support in a preferred mode. When the gas separation membrane comprises the support, a certain level of strength can be imparted to the gas separation membrane. Examples of the gas separation membrane comprising the support are illustrated in FIGS. 1 and 2.

FIG. 1 is a schematic diagram illustrating a cross section of a gas separation membrane 1 that is a flat membrane. The schematic diagram illustrates a cross section of a gas separation membrane 1 comprising: a composite membrane 2 containing a gas separation functional layer 3 and a composite compound 4; and a support 5 placed on one surface of the composite membrane 2. Further, spacers 7 are placed on both surfaces of the gas separation membrane 1.

FIG. 2 is a schematic diagram illustrating a cross section of a gas separation membrane 1 that is a hollow fiber membrane, which cross section is perpendicular to the fiber axis direction. The schematic diagram illustrates a cross section of a gas separation membrane 1 comprising: a composite membrane 2 containing a gas separation functional layer 3 and a composite compound 4; and a support 5 placed on one surface of the composite membrane 2. Further, spacers 7 are placed on the outer surface of the gas separation membrane 1.

Figure 3:
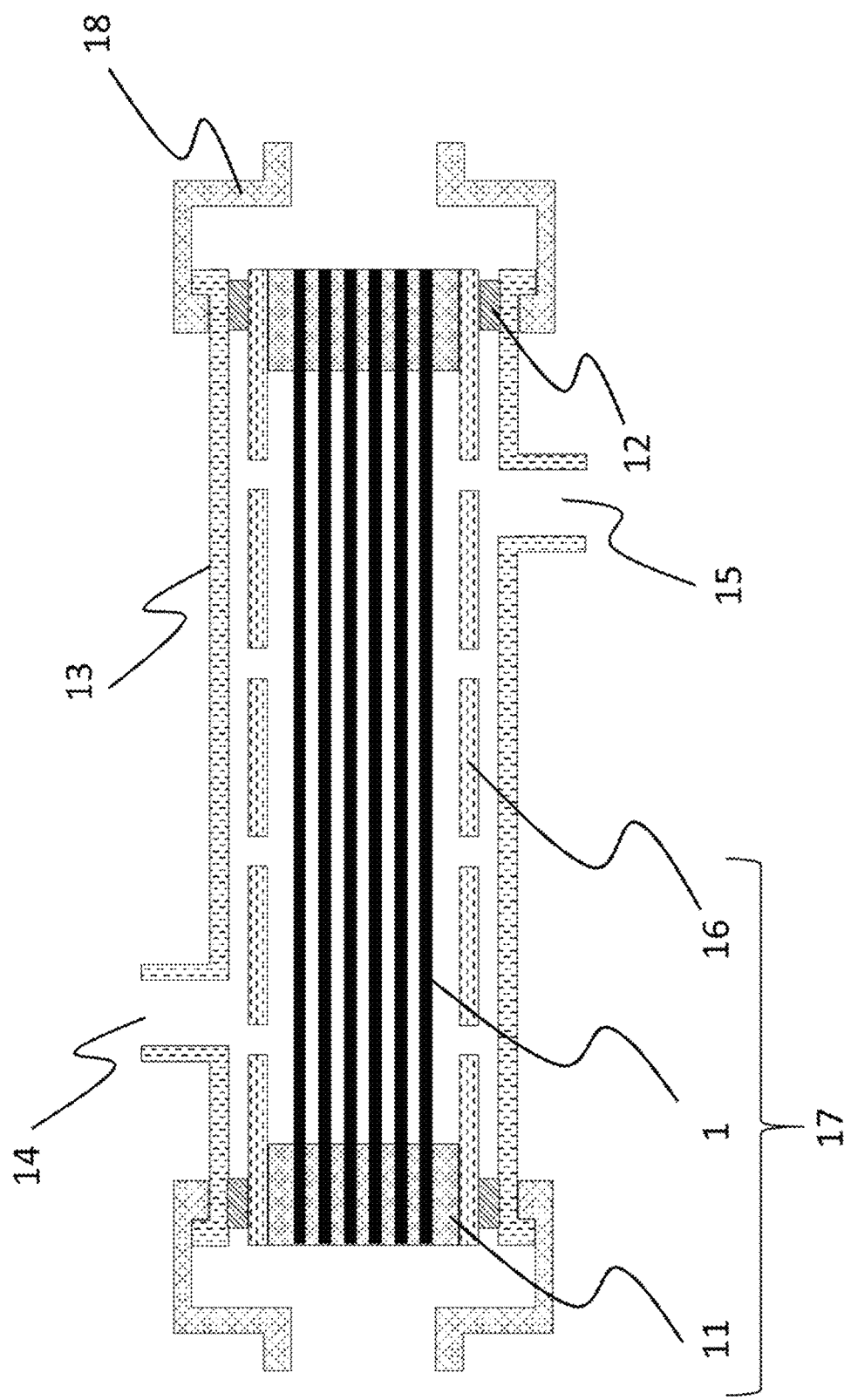
FIG. 3 is a schematic diagram illustrating a cross section of one mode of the gas separation membrane module, which cross section includes an inlet and an outlet.

As one mode of the gas separation membrane module, FIG. 3 shows a schematic cross-sectional view of a gas separation membrane module in which a plurality of gas separation membranes that are hollow fiber membranes are placed. FIG. 3 is a schematic diagram illustrating a cross section of the module, including an inlet and an outlet. The gas separation membrane module comprises a gas separation membrane element 17 in a vessel 13 having an inlet 14 and an outlet 15 of a mixed gas to be separated. The gas separation membrane element 17 comprises a plurality of gas separation membranes 1 bundled in parallel in an element casing 16, which plurality of gas separation membranes 1 are fixed (potted), at their both ends, to each other and to the element casing 16 at potting sites 11. The gas separation membranes 1 penetrate the potting sites 11, and are connected to external channels (such as channels for collecting the fluid that has permeated through the gas separation membrane) not shown in the figure, through caps 18 attached to the outer side of the vessel 13. The gas separation membrane element 17 is placed in the vessel 13 through adapters 12.

The composite membrane comprises a gas separation functional layer and a composite compound, wherein the gas separation functional layer and the composite compound are combined together. The "combining" of the gas separation functional layer and the composite compound means a mode in which the gas separation functional layer and the composite compound are united together and in which the position of the composite compound is fixed. Thus, a mode in which the composite compound is simply adhering is not included in the state where the gas separation functional layer and the composite compound are "combined". When the gas separation functional layer and the composite compound are "combined", the composite compound cannot be removed using a dust remover, brush, or the like without damaging the gas separation functional layer and the composite compound.

As described above, the composite compound is a compound different from a compound constituting the gas separation functional layer, and has a function to reinforce a site where the strength of the gas separation functional layer is low. The site where the strength of the gas separation functional layer is low means, for example, a site where the gas separation functional layer is locally thin, a site lacking the gas separation functional layer, a site where the gas separation functional layer has a defect such as a crack. Sites where the strength of the gas separation functional layer is low stochastically occur during the preparation process of the gas separation functional layer and the preparation process of the gas separation membrane module.

The composite compound is not limited as long as it is a compound different from a compound constituting the gas separation functional layer. The composite compound is preferably a composite compound formed by counter diffusion reaction since the compound does not cover the surface of the gas separation functional layer and hence does not inhibit the permeability to the permeating gas. The composite compound formed by counter diffusion reaction is capable of reinforcing sites lacking the gas separation functional layer by, for example, supplying one substrate from one surface of the composite membrane before the formation of the composite compound while supplying the other substrate from the other surface of the composite membrane before the formation of the composite compound.

Examples of the composite compound formed by counter diffusion reaction include metal-organic frameworks (MOFs), silica, phenolic resins, and urethane resins. Two or more of these may be used. Among these, the composite compound is preferably a compound selected from the group consisting of silica, phenolic resins, and urethane resins.

An MOF is a crystalline porous substance having a regular structure produced by formation of a coordinate bond between a metal ion generated by dissolution of a metal salt in a solution and an organic ligand capable of forming the coordinate bond with the metal ion. It is, for example, a composite compound formed by counter diffusion reaction between a metal ion solution and an organic ligand solution. Examples of the MOF include Cu-BTC, MOF-5, IRMOF-3, MIL-47, MIL-53, MIL-96, MMOF, SIM-1, ZIF-7, ZIF-8, ZIF-22, ZIF-69, and ZIF-90.

Silica is a compound containing silicon dioxide, and is a composite compound formed by counter diffusion reaction between a silica source-containing gas and an oxygen-containing gas, or by counter diffusion reaction between a silicate solution and a gas that cures the solution. From the viewpoint of allowing the formation at normal temperature, the silica is more preferably formed by counter diffusion reaction between a silicate solution and a gas that cures the solution When a silica source-containing gas and an oxygen-containing gas are used for formation of the silica, examples of the silica source include tetraalkoxysilane, monoalkoxysilane, halosilane, silane, and disiloxane. Examples of the oxygen-containing gas include oxygen gas, ozone gas, and water vapor.

Each of the silica source-containing gas and the oxygen-containing gas may be a mixed gas with an inert gas. Examples of the inert gas include nitrogen gas, argon gas, helium gas, and neon gas.

When a silicate solution and a gas that cures the solution are used for formation of the silica, examples of the silicate include sodium silicate, potassium silicate, sodium metasilicate, potassium metasilicate, lithium silicate, ammonium silicate, colloidal silica, and alkyl silicate. A mixture of a plurality of silicates may be used. When sodium silicate is used, the molar ratio of $SiO_2/Na_2O$ is preferably 2.0 to 3.3, more preferably 2.1 to 3.1 from the viewpoint of handling. Among silicates, at least one compound selected from the group consisting of sodium silicate, potassium silicate, sodium metasilicate, and potassium metasilicate is preferred. At least one compound selected from the group consisting of sodium metasilicate and potassium metasilicate is more preferred.

Examples of the gas that cures the silicate solution include acidic gases such as carbon dioxide, hydrogen sulfide, sulfur oxide, nitrogen oxide, inorganic acids (such as hydrogen chloride), and organic acids (such as carboxylic acid); and gases that generate an acid by reaction with a silicate solution such as esters (including organic esters and inorganic esters). A mixture of a plurality of the gases may be used, or a mixed gas with an inert gas may be used.

Examples of the organic esters include carboxylic acid esters such as methyl formate, ethyl formate, methyl acetate, ethyl acetate, methyl propionate, ethyl propionate, methyl butyrate, ethyl butyrate, methyl lactate, ethyl lactate, methyl sebacate, ethylene glycol diacetate, diacetin, and triacetin; lactones such as γ-butyrolactone, γ-caprolactone, δ-valerolactone, δ-caprolactone, β-propiolactone, and ε-caprolactone; and cyclic alkylene carbonates (organic carbonic acid esters) such as ethylene carbonate, propylene carbonate, 4-ethyldioxolane, 4-butyldioxolane, 4,4-dimethyldioxolane, and 4,5-dimethyldioxolane.

From the viewpoint of safety, carbon dioxide or methyl formate is preferably used as the gas that cures the silicate solution. Carbon dioxide is more preferably used.

A phenolic resin is a resin obtained by reaction between a phenol and an aldehyde, and is a composite compound formed by, for example, counter diffusion reaction between a water-soluble phenolic resin prepolymer prepared by polycondensation of a phenol and an aldehyde, and a gas that cures the water-soluble phenolic resin prepolymer.

Examples of the water-soluble phenolic resin prepolymer include phenolic resin prepolymers obtained by, for example, reacting a raw material phenol such as phenol, cresol, resorcinol, bisphenol A, or another substituted phenol, with an aldehyde compound or the like in the presence of an alkaline catalyst.

Examples of the gas that cures the water-soluble phenolic resin prepolymer include acidic gases such as carbon dioxide, hydrogen sulfide, sulfur oxide, nitrogen oxide, inorganic acids (such as hydrogen chloride), and organic acids (such as carboxylic acid); and gases that generate an acid by reaction with a water-soluble phenolic resin prepolymer such as esters (including organic esters and inorganic esters). A mixture of a plurality of the gases may be used, or a mixed gas with an inert gas may be used.

Examples of the organic esters include carboxylic acid esters such as methyl formate, ethyl formate, methyl acetate, ethyl acetate, methyl propionate, ethyl propionate, methyl butyrate, ethyl butyrate, methyl lactate, ethyl lactate, methyl sebacate, ethylene glycol diacetate, diacetin, and triacetin; lactones such as γ-butyrolactone, γ-caprolactone, δ-valerolactone, δ-caprolactone, β-propiolactone, and ε-caprolactone; and cyclic alkylene carbonates (organic carbonic acid esters) such as ethylene carbonate, propylene carbonate, 4-ethyldioxolane, 4-butyldioxolane, 4,4-dimethyldioxolane, and 4,5-dimethyldioxolane.

From the viewpoint of safety, carbon dioxide or methyl formate is preferably used as the gas that cures the water-soluble phenolic resin prepolymer. Carbon dioxide is more preferably used.

A urethane resin is a resin obtained by polyaddition reaction between a polyol and a polyisocyanate, and is a composite compound formed by, for example, counter diffusion reaction between a urethane resin prepolymer that is a mixture of a phenolic compound as a polyol and a polyisocyanate, and an amine gas that acts as a catalyst of the polyaddition reaction.

Examples of the phenolic compound include phenolic compounds obtained by, for example, reacting a raw material phenol such as phenol, cresol, resorcinol, bisphenol A, or another substituted phenol with an aldehyde compound or the like in the presence of an alkaline catalyst.

The polyisocyanate is an organic compound containing two or more isocyanates in one molecule, and includes aliphatic or aromatic polyisocyanate compounds, and modified products thereof. Examples of the aliphatic polyisocyanates include hexamethylene diisocyanate, isophorone diisocyanate, dicyclohexylmethane diisocyanate, and methylcyclohexane diisocyanate. Examples of the aromatic polyisocyanates include toluene diisocyanate, diphenylmethane diisocyanate, and polymeric diphenylmethane diisocyanate. Examples of the modified products thereof include carbodiimide-modified products and prepolymer-modified products.

Examples of the amine gas that cures the urethane resin prepolymer include triethylamine, dimethylethylamine, and dimethylisopropylamine.

The composite membrane before formation of the composite compound, that is, the membrane having the gas separation functional layer without formation of the composite compound, is an "uncombined membrane". When the membrane having the gas separation functional layer (uncombined membrane) is a hollow fiber membrane, or in cases where the distance between membranes (uncombined membranes) having the gas separation functional layer is small in a gas separation membrane module in which the membranes having the gas separation functional layer are placed, a composite compound whose at least one substrate of the counter diffusion reaction is a gas may be preferably used. Since a gas is more diffusive than a solution, a composite compound whose at least one substrate of the counter diffusion reaction is a gas is capable of reinforcing even a site to which a solution is less diffusive and where the strength of the gas separation functional layer is low.

The gas separation functional layer means a portion having higher permeability to a permeating gas than to a non-permeating gas, which portion hence has gas permeation selectivity. The shape of the gas separation functional layer is not limited and, for example, a flat membrane may be used as illustrated in FIG. 1. However, the shape of the gas separation functional layer is preferably a hollow fiber membrane as illustrated in FIG. 2 since, when a gas separation membrane module is formed therewith, the membrane area per module unit volume can be easily increased. Thus, the gas separation membrane is more preferably a hollow fiber membrane although a flat membrane may be used.

Preferred examples of the compound constituting the gas separation functional layer include inorganic compounds such as zeolite, MOF, and carbon when the gas separation functional layer is an inorganic membrane; and polymer compounds when the gas separation functional layer is a polymer membrane. In particular, when the compound constituting the gas separation functional layer is an inorganic compound, a mode in which a compound selected from the group consisting of zeolite and carbon is contained is more preferred.

Zeolite is an aluminosilicate, and examples thereof include the NaX type (FAU), ZSM-5, MOR, silicalite, and the A type. Two or more of these may be used. The zeolite species is preferably one having an Si/Al ratio that is almost the same as the ratio achieved by the secondary growth by hydrothermal synthesis reaction.

Examples of the MOF include Cu-BTC, MOF-5, IRMOF-3, MIL-47, MIL-53, MIL-96, MMOF, SIM-1, ZIF-7, ZIF-8, ZIF-22, ZIF-69, and ZIF-90. Two or more of these may be used.

Examples of the carbon include those prepared by carbonization of polyphenylene oxide, polyvinyl alcohol, polyacrylonitrile, phenolic resin, wholly aromatic polyester, unsaturated polyester resin, alkyd resin, melamine resin, urea resin, polyimide resin, diallyl phthalate resin, lignin resin, urethane resin or the like. Two or more of these may be used.

In one configuration of the gas separation functional layer, a carbon membrane prepared by carbonization of a polymer membrane obtained by spinning or membrane formation may be preferably used. Use of such a carbon membrane for preparing the composite membrane enables reinforcement of sites where the strength of the gas separation functional layer is low, which low strength is due to variation of the fiber diameter or membrane thickness caused during the spinning process or membrane-forming process, or due to the gas generated during the carbonization step, which reinforcement has been difficult in the conventional techniques.

In one configuration of the composite membrane, a composite membrane comprising: a gas separation functional layer constituted of an inorganic compound; and a composite compound composed of an organic compound, may be preferably used. Preferred examples of the organic compound in this configuration include phenolic resins and urethane resins. In the composite membrane, the organic compound, which has high viscoelasticity, reinforces sites where the strength of the gas separation functional layer, which is composed of a hard and fragile inorganic compound, is low. Thus, the external force is reduced to enable better suppression of breakage of the composite membrane.

Examples of the polymer compound constituting the gas separation functional layer include aromatic polyimide, cellulose acetate, polysulfone, aromatic polyamide, polyetherimide, polyethersulfone, polyacrylonitrile, polyphenylene sulfide, polyether ether ketone, polytetrafluoroethylene, polyvinylidene fluoride, poly(1-trimethylsilylpropyne), polydimethylsiloxane, polyvinyltrimethylsilane, poly(4-methylpentene), ethyl cellulose, natural rubber, poly(2,6-dimethylphenylene oxide), low-density polyethylene, high-density polyethylene, styrene, polyethyl methacrylate, polycarbonate, polyester, aliphatic polyamide, polymethyl methacrylate, polyvinyl alcohol, and silicone. Two or more of these may be used.

In one configuration of the gas separation functional layer, a polymer hollow fiber membrane prepared by spinning or a polymer flat membrane prepared by membrane formation may be preferably used. The use of such a polymer membrane as the composite membrane enables reinforcement of sites where the strength of the gas separation functional layer is low, which low strength is due to variation of the fiber diameter or membrane thickness caused during the spinning process or membrane-forming process, which reinforcement has been difficult in the conventional techniques.

In one configuration of the composite membrane, a composite membrane comprising: a gas separation functional layer constituted by a polymer compound; and a composite compound composed of an inorganic compound, may be preferably used. Preferred examples of the inorganic compound in this configuration include MOF and silica. In the composite membrane, the inorganic compound, which has high strength, reinforces sites where the strength of the polymer membrane, which has low elastic modulus, is low. Thus, breakage of the composite membrane due to the external force is better suppressed.

The thickness of the gas separation functional layer is preferably 0.01 μm to 10 μm. When the thickness of the gas separation functional layer is not less than 0.01 μm, the composite membrane shows high resistance to breakage due to the external force. The thickness of the gas separation functional layer is more preferably not less than 0.1 μm, still more preferably not less than 1 μm. On the other hand, when the thickness of the gas separation functional layer is not more than 10 μm, permeability to the permeating gas can be secured. The thickness of the gas separation functional layer is more preferably not more than 5 μm, still more preferably not more than 2 μm.

The composite membrane enables reinforcement of sites where the strength of the gas separation functional layer is low, while suppressing a decrease in the permeability to the permeating gas caused by an increase in the membrane thickness, which has been problematic when a compound having the same composition as the gas separation functional layer is combined.

In one configuration, the gas separation membrane may comprise a support. When the gas separation membrane comprises a support, the support is more preferably placed only on one surface of the composite membrane.

In the gas separation membrane, the composite compound reinforces sites where the strength of the gas separation functional layer is low, and at the same time, the composite compound functions as an anchor that fixes the gas separation functional layer to the support. Thus, since the composite compound is capable of suppressing detachment of the gas separation functional layer from the support during the preparation process of the gas separation membrane module or during the use of the gas separation membrane module, it is important for the gas separation membrane to contain the composite compound in its composite membrane.

To increase the anchor effect, a porous support may be preferably used as the support. The porous support preferably has an average pore size of 10 nm to 3 μm. When the porous support has an average pore size of not less than 10 nm, the composite compound can easily enter the inside of the porous support so that the anchor effect between the porous support and the composite compound increases. The porous support has an average pore size of more preferably not less than 50 nm, still more preferably not less than 100 nm. On the other hand, when the porous support has an average pore size of not more than 10 μm, the contact surface area between the porous support and the composite compound per unit volume increases so that the anchor effect between the porous support and the composite compound increases. The porous support has an average pore size of more preferably not more than 2 μm, still more preferably not more than 1 μm.

Examples of the porous support include porous inorganic materials such as alumina, silica, cordierite, zirconia, titania, Vycor glass, zeolite, magnesia, and sintered metals; porous organic materials containing at least one polymer selected from the group consisting of homopolymers and copolymers such as polysulfones, polyethersulfones, polyamides, polyesters, cellulosic polymers, vinyl polymers, polyphenylene sulfides, polyphenylene sulfide sulfones, polyphenylene sulfones, and polyphenylene oxides; and porous carbon materials prepared by carbonization of a porous organic material composed of a carbonizable resin. Examples of the carbonizable resin include polyphenylene oxides, polyvinyl alcohols, polyacrylonitriles, phenolic resins, wholly aromatic polyesters, unsaturated polyester resins, alkyd resins, melamine resins, urea resins, polyimide resins, diallyl phthalate resins, lignin resins, and urethane resins. Two or more of these may be used.

In one configuration, the gas separation membrane may be a hollow fiber membrane. When the gas separation membrane is a hollow fiber membrane, the inner diameter of the composite membrane is preferably 10 μm to 2000 μm. When the inner diameter of the composite membrane is not less than 10 gas flow can be improved. The inner diameter of the composite membrane is more preferably not less than 20 μm, still more preferably not less than 50 μm. On the other hand, when the inner diameter of the composite membrane is not more than 2000 μm, the membrane area of the gas separation membrane per unit volume can be increased when a gas separation membrane module is provided. The inner diameter of the composite membrane is more preferably not more than 1000 μm, still more preferably not more than 500 μm.

In the gas separation membrane, the presence ratio of the gas separation functional layer at at least one surface is not less than 90% and less than 100%. The presence ratio of the gas separation functional layer at at least one surface of the gas separation membrane means the ratio at which the gas separation functional layer is present in a mode in which the gas separation functional layer can be seen on the outermost layer by observation of one surface of the gas separation membrane. When the presence ratio of the gas separation functional layer at at least one surface of the gas separation membrane is not less than 90.0%, the permeability to the permeating gas is not deteriorated. The presence ratio of the gas separation functional layer at at least one surface of the gas separation membrane is more preferably not less than 95.0%. When the presence ratio of the gas separation functional layer at at least one surface of the gas separation membrane is less than 100%, sites where the strength of the gas separation functional layer is low can be reinforced. The presence ratio of the gas separation functional layer at at least one surface of the gas separation membrane is more preferably not more than 99.5%, still more preferably not more than 99.0%.

When the gas separation membrane does not comprise a support, or where composite membranes are placed on both sides of the support, the presence ratio of the gas separation functional layer is more preferably not less than 90.0% and less than 100% on both surfaces of the gas separation membrane from the viewpoint of not deteriorating the permeability to the permeating gas. When the presence ratio of the gas separation functional layer is not less than 90.0% on both surfaces of the gas separation membrane, the permeability to the permeating gas is not deteriorated. On both surfaces of the gas separation membrane, the presence ratio of the gas separation functional layer is more preferably not less than 95.0%. When the presence ratio of the gas separation functional layer is less than 100% on both surfaces of the gas separation membrane, sites where the strength of the gas separation functional layer is low can be reinforced. On both surfaces of the gas separation membrane, the presence ratio of the gas separation functional layer is more preferably not more than 99.5%, still more preferably not more than 99.0%.

When the gas separation membrane comprises a support, more specifically, in a gas separation membrane having a composite membrane placed on at least one surface (surface A), and having a support placed on the other surface (surface B), the presence ratio of the gas separation functional layer on surface A is more preferably not less than 90.0% and less than 100% from the viewpoint of not deteriorating the permeability to the permeating gas. When the presence ratio of the gas separation functional layer on surface A of the gas separation membrane is not less than 90.0%, the permeability to the permeating gas is not deteriorated. The presence ratio of the gas separation functional layer on surface A of the gas separation membrane is more preferably not less than 95.0%. When the presence ratio of the gas separation functional layer on surface A of the gas separation membrane is less than 100%, sites where the strength of the gas separation functional layer is low can be reinforced. The presence ratio of the gas separation functional layer on surface A of the gas separation membrane is more preferably not more than 99.5%, still more preferably not more than 99.0%.

In some modes, spacers or the like for retaining an appropriate space between gas separation membranes are placed on surfaces of the gas separation membranes. When a surface of a gas separation membrane is discussed, the surface does not include the spacers or the like.

The presence ratio of the gas separation functional layer on surface A can be evaluated by a method employing the combination of a scanning microscope (SEM) and an energy dispersive X-ray spectrometry (EDX) (SEM-EDX). By evaluating surface A by SEM-EDX, the presence or absence of the composite compound or the coating material, the presence or absence of exposure of the support, and/or the like on surface A can be qualitatively confirmed. In addition, since evaluation of the elemental composition of the site under observation is possible, positions of the gas separation functional layer and the composite compound can be identified.

When element X is present in the gas separation functional layer, but absent in the composite compound, areas with high presence ratios of element X correspond to the gas separation functional layer. In a mapping diagram of element X on the surface of the gas separation membrane, when the presence ratio of element X in the area having the highest presence ratio of element X is $C_X$ at %, $C_X/2$ at % may be used as the threshold to distinguish between the gas separation functional layer and the composite compound. Thus, the presence ratio of the gas separation functional layer is the ratio of the area where the presence ratio of element X is from $C_X/2$ at % to $C_X$ at % in the area of surface A in the observation field.

When element Y is present in the composite compound, but absent in the gas separation functional layer, areas with high presence ratios of element Y correspond to the composite compound. In a mapping diagram of element Y on the surface of the gas separation membrane, when the presence ratio of element Y in the area having the highest presence ratio of element Y is $C_Y$ at %, $C_Y/2$ at % may be used as the threshold to distinguish between the gas separation functional layer and the composite compound. Thus, the presence ratio of the gas separation functional layer is the ratio of the area where the presence ratio of element Y is not more than $C_Y/2$ at % in the area of surface A in the observation field.

When element Z is present in both the gas separation functional layer and the composite compound, but its content ratio is different therebetween, the area where the gas separation functional layer is present can be determined by providing a threshold of the presence ratio of element Z. In a mapping diagram of element Z on the surface of the gas separation membrane, when the presence ratio of element Z in the area having the highest presence ratio of element Z is $C_{Z1}$ at %, and the presence ratio of element Z in the area having the lowest presence ratio of element Z is $C_{Z2}$ at %, $(C_{Z1}+C_{Z2})/2$ at % may be used as the threshold to distinguish between the gas separation functional layer and the composite compound. Thus, when the gas separation functional layer contains a larger amount of element Z, the presence ratio of the composite compound is the ratio of the area where the presence ratio of element Z is from $(C_{Z1}+C_{Z2})/2$ at % to $C_{Z1}$ at % in the area of surface A in the observation field. When the composite compound contains a larger amount of element Z, the presence ratio of the gas separation functional layer is the ratio of the area where the presence ratio of element Z is from $(C_{Z1}+C_{Z2})/2$ at % to $C_{Z1}$ at % in the area of surface A in the observation field. When element Z, which is present in both the gas separation functional layer and the composite compound, but whose content is different therebetween, is to be investigated, element Z is selected such that the difference between $C_{Z1}$ and $C_{Z2}$ is largest.

When the composite compound is present on the entire surface of the composite membrane, the surface (surface C) after removal of the composite compound from the surface of the composite membrane is observed by SEM-EDX, and the $C_X$ at % or $C_Z$ at % obtained is used to evaluate the presence ratio of the gas separation functional layer on surface A.

On the surface of the gas separation membrane, the size of at least part of the composite compound is preferably 0.1 μm to 100 μm. When the size of the composite compound is not less than 0.1 μm, sites where the strength of the gas separation functional layer is low can be sufficiently reinforced. The size of the composite compound is more preferably not less than 0.5 μm, still more preferably not less than 1 μm. On the other hand, when the size of the composite compound is not more than 100 μm, the ratio of the gas separation functional layer in the composite membrane can be increased to allow better production of the function as the gas separation membrane. The size of the composite compound is more preferably not more than 50 μm, still more preferably not more than 10 μm.

The size of the composite compound on the surface of the gas separation membrane means the maximum value of the diameter of the minimum circumscribed circle of each composite compound identified by SEM-EDX observation in the observation area.

The gas separation membrane module is a module in which the gas separation membrane is placed, and examples of the module include spiral-type modules in which a gas separation membrane having a flat-membrane shape is wound around a central pipe together with spacers and/or the like, and hollow fiber membrane modules in which a plurality of gas separation membranes having a hollow fiber membrane shape are placed.

A spiral-type module is a module comprising laminates composed of a permeating-gas channel material, a gas separation membrane, a supplied-gas channel material, and a non-gas-permeable coating layer, which laminates are wound around a central pipe and fixed to each other. The fixation of the laminates to each other is carried out as follows. The gas separation membrane is adhered to the permeating-gas channel material, and the laminates are adhered to each other. To secure a channel of the permeating gas in the permeating-gas channel material, the laminates are wound around the central pipe in a state where a potting material is applied to the three sides, not including the side in contact with the central pipe, of the surface in the permeating-gas-channel-material side of the laminates.

In the central pipe, a penetrating hole is formed, and this functions as a channel for recovering the permeating gas that has permeated through the gas separation membrane.

The supplied-gas channel material functions as a spacer between the gas separation membrane and the coating layer in the laminate and constitutes a channel of the supplied gas. The supplied-gas channel material preferably generates a turbulent flow of the supplied gas, and is preferably a member having a net shape, a woven fabric shape, a non-woven fabric shape, a porous shape or the like.

The permeating-gas channel material functions as a spacer between the gas separation membrane and the coating layer of vicinal laminates and constitutes a channel through which the permeating gas passes toward the winding center (inner side) of the laminates to reach the penetrating hole of the central cylinder pipe. From the viewpoint of appropriately forming the channel of the permeating gas, the permeating-gas channel material preferably allows permeation of the potting material, and is preferably a member having a net shape, a woven fabric shape, a non-woven fabric shape, a porous shape or the like.

A hollow fiber membrane module is a module comprising a gas separation membrane element containing a plurality of gas separation membranes fixed by a potting material, which gas separation membrane element is fixed to the inner surface of a vessel. Examples of the method of fixing the gas separation membrane element to the inner surface of the vessel include a method in which the element is directly fixed to the inner surface of the vessel using the potting material itself, and a method in which the element is fixed in the vessel through an adapter or the like capable of securing liquid-tightness or air-tightness (such as an O-ring). From the viewpoint of enabling replacement of the gas separation membrane element alone when the performance of the gas separation membrane element decreased due to aging, it is preferred to fix the element in the vessel through the adapter or the like.

In one configuration, the gas separation membrane element may have a casing (element casing) that is different from the vessel. Examples of the material of the element casing include metals, resins, and fiber-reinforced plastics (FRPs), and these may be appropriately selected depending on the working conditions. Resins are preferred since they have high conformability to shrinkage due to curing of the potting material. Polyphenylene sulfide, polytetrafluoroethylene, polyethylene, polypropylene, polyether ether ketone, polyphenylene ether, polyetherimide, polyamide imide, and polysulfone are more preferred since they have both moldability and chemical resistance.

The potting portion of the gas separation membrane element may be located at either a single site or a plurality of sites, but, from the viewpoint of sufficiently fixing the position of the gas separation membrane and maintaining the effective surface area of the gas separation membrane, it is preferred to fix both ends of an almost linear bundle of a plurality of gas separation membranes using the potting material at two sites. Alternatively, a bundle of a plurality of gas separation membranes may be folded into a U-shape, and both ends of the gas separation membranes may be fixed using the potting material at a single site. Alternatively, only one end of the gas separation membranes may be fixed using the potting material, and the other end may be sealed using means other than the potting material.

Examples of the potting material for spiral-type modules and hollow fiber membrane modules include thermoplastic resins and thermosetting resins. Other additives may also be contained.

Examples of the thermoplastic resins include polyethylene, polyethersulfone, polystyrene, polyphenylene sulfide, polyarylate, polyester, liquid crystal polyester, polyamide, and polymethyl methacrylate. Examples of the thermosetting resins include epoxy resins, unsaturated polyester resins, urethane resins, urea resins, phenolic resins, melamine resins, and silicone resins. Two or more of these may be used. Among these, epoxy resins and urethane resins are preferred from the viewpoint of the balance among the moldability, the curing time, the adhesiveness, the hardness and the like.

Examples of the additives include fillers, surfactants, silane coupling agents, and rubber components. Examples of the fillers include silica, talc, zeolite, calcium hydroxide, and calcium carbonate. These produce effects such as suppression of heat generation upon curing, improvement of the strength, and thickening. Surfactants and silane coupling agents produce effects such as improvement of ease of handling during mixing of the potting material, and improvement of infiltration between gas separation membranes during injection of the potting material. Rubber components produce effects such as improvement of toughness of the potting material after curing molding. The rubber components may be contained in the form of rubber particles.

In the gas separation membrane module, the gas separation membranes are placed such that the distance between vicinal composite membranes is 10 µm to 2000 µm. When the distance between vicinal composite membranes is not less than 10 µm, gas flow can be improved. The distance between vicinal composite membranes is more preferably not less than 20 µm, still more preferably not less than 50 µm. On the other hand, when the distance between vicinal composite membranes is not more than 2,000 µm, the membrane area of the gas separation membrane per unit volume can be increased when a gas separation membrane module is provided. The distance between vicinal composite membranes is more preferably not more than 1,000 µm, still more preferably not more than 500 µm. When the gas separation membrane is a flat membrane, the distance between vicinal composite membranes means the distance between composite membranes in a part where spirally wound gas separation membranes are adjacent to each other. When the gas separation membrane is a hollow fiber membrane, the distance between vicinal composite membranes means the distance between the composite membranes of adjacent gas separation membranes.

The method of producing the gas separation membrane module is not limited, and may be a production method wherein a gas separation membrane comprising a gas separation functional layer and a composite compound is placed, or may be a production method wherein a module in which a membrane comprising a gas separation functional layer (uncombined membrane) is placed is prepared followed by formation of a composite compound. From the viewpoint of securely reinforcing sites where the strength of the gas separation functional layer is low, which sites are generated during the process of preparing the gas separation functional layer or the process of preparing the gas separation membrane module, the production method is more preferably the method wherein a module in which a membrane comprising a gas separation functional layer (uncombined membrane) is placed is prepared followed by formation of a composite compound.

Examples of the method of producing the gas separation membrane include, but are not limited to, a method of producing a gas separation membrane comprising a composite membrane, the composite membrane comprising: a gas separation functional layer; and a compound (composite compound) different from a compound constituting the gas separation functional layer, the method comprising passing a gas or solution as a substrate of the composite compound, into a space separated by a membrane comprising the gas separation functional layer (uncombined membrane); and passing a gas that cures the gas or solution into the other space separated by the uncombined membrane.

Through the above steps, the composite compound can be formed at the sites where the strength of the gas separation functional layer is low in the uncombined membrane.

In the first step, it is more preferred to reduce the pressure of the other space separated by the uncombined membrane. By this, the substrate of the composite compound supplied in Step 1 can be securely distributed throughout the sites where the strength of the gas separation functional layer is low.

The order of the first and second steps is not limited. When the substrate of the composite compound used in the first step is a solution, the second step is more preferably carried out after the first step. By carrying out the second step after the first step, the sites where the strength of the gas separation functional layer is low can be more securely reinforced.

Preferred examples of the gas or solution as the substrate of the composite compound include silica source-containing gases, silicate solutions, phenolic resin solutions, and polyisocyanate solutions.

The gas separation membrane module is capable of suppressing damage of the gas separation functional layer during the use of the gas separation membrane module, without deteriorating the permeability to the permeating gas.

Although the use of the module is not limited, the module may be preferably used for uses such as a system for separation/storage of carbon dioxide from an exhaust of a power plant, blast furnace or the like, removal of sulfur components from a gasified fuel gas in the integrated coal gasification combined cycle, purification of a biogas or natural gas, and hydrogen purification from an organic hydride.

EXAMPLES

Our membranes, modules and methods are described below in detail by way of Examples and Comparative Examples. However, this disclosure is not limited thereto. The evaluations in Examples and Comparative Examples were carried out by the following methods.

Thickness of Gas Separation Functional Layer

For the gas separation membranes of Examples 1, 2, 3, 4, and 5, and Comparative Example 1, SEM observation of a cross section perpendicular to the fiber axis was carried out. The thickness of the gas separation functional layer was measured at five arbitrary sites, and the arithmetic average expressed to two significant figures was regarded as the thickness of the separation functional layer in the gas separation membrane.

Strength of Gas Separation Membrane in Module Preparation Step

Each of the gas separation membranes of Examples 1, 2, 3, and 5, and Comparative Example 1 was rated for the ratio of the permeability to the non-permeating gas after the modularization, to the permeability to the non-permeating gas before the modularization. When the ratio was less than 2-fold, the membrane was rated as "excellent". When the ratio was not less than 2-fold and less than 10-fold, the membrane was rated as "good". When the ratio was not less than 10-fold, the membrane was rated as "poor".

Strength of Gas Separation Membrane During Use of Module

To each of the gas separation membranes of Examples 1, 2, 3, 4, and 5, and Comparative Examples 1 and 2, nitrogen gas (80° C., 20 RH %) was intermittently supplied for 1 week at 1 L/min from the inlet of the gas separation membrane module (the supply time was 8 hours per day). When the ratio of the permeability to the non-permeating gas in the gas separation membrane module after the gas supply, to the permeability to the non-permeating gas in the gas separation membrane module before the gas supply, was less than 2-fold, the membrane was rated as "excellent". When the ratio was not less than 2-fold and less than 10-fold, the membrane was rated as "good". When the ratio was not less than 10-fold, the membrane was rated as "poor". When the strength of the gas separation membrane in the module preparation step was "poor", the membrane was excluded from the evaluation.

Presence Ratio of Gas Separation Functional Layer on One Surface of Gas Separation Membrane A 1-cm piece of the gas separation membrane was sampled, and the surface on which the composite membrane is placed was observed using a scanning electron microscope S-5500 (manufactured by Hitachi High-Tech Corporation). At a magnification corresponding to 1±0.1 (nm/pixel), not less than 700,000 pixels were observed from above, and an investigation area of 512×512 pixels was set from the observed image. The gas separation functional layer in the investigation area was identified by EDX.

In Example 1 and Comparative Example 1, Zn element was investigated as an element that is present in the gas separation functional layer, but absent in the composite compound. In Example 2 and Example 5, Si element was investigated as an element that is present in the composite compound, but absent in the gas separation functional layer. In Example 3 and Example 4, O element was investigated as an element contained in a larger amount in the composite compound. In Comparative Example 1, C element was investigated as an element contained in a larger amount in the gas separation functional layer.

For the investigated element, the average of the presence ratio in the gas separation functional layer and the presence ratio in the composite compound was used as a threshold to identify the gas separation functional layer and the composite compound. The ratio of the gas separation functional layer on the surface in the investigation area was calculated according to the following equation, wherein $S_A$ represents the area of the gas separation membrane in the investigation area, and wherein $S_B$ represents the area of the gas separation functional layer in the investigation area.

The ratio of the gas separation functional layer on the surface in the investigation area was calculated at 20 arbitrary sites, and the arithmetic average expressed to three significant figures was regarded as the ratio of the gas separation functional layer on the surface of the gas separation membrane.

$$\text{Ratio of the gas separation functional layer on the surface (\%)} = S_B/S_A \times 100$$

Size of Composite Compound on One Surface of Gas Separation Membrane

For the surface of the gas separation membrane of each of Examples 1, 2, 3, 4, and 5, the diameter of the minimum circumscribed circle of each composite compound identified by SEM-EDX observation was measured. The maximum value of the diameter of the minimum circumscribed circle in the observation area was expressed to two significant figures, which was regarded as the size of the composite compound on one surface of the gas separation membrane.

Distance Between Vicinal Composite Membranes

For each of the gas separation membrane modules of Examples 1, 2, 3, 4, and 5, and Comparative Examples 1 and 2, the end of a potting site was cut in a direction almost perpendicular to the axis direction of the gas separation membrane, and the cross section was observed from above using a digital microscope VHX-7000 (manufactured by KEYENCE CORPORATION). For the obtained image, the distance between vicinal composite membranes was measured at not less than 20 sites, and the arithmetic average expressed to two significant figures was regarded as the distance between vicinal composite membranes.

Example 1

As a porous support, alumina having an average pore size of 100 nm to 250 nm, an outer diameter of 2 mm, and a length of 10 cm was used. On the surface, ZIF-8, which is an MOF, was synthesized as a gas separation functional layer. Regarding the method of synthesizing ZIF-8, a solution of zinc nitrate hexahydrate in methanol (0.4 mol/L) was prepared, and the solution supplied to the outer surface of the porous support. Subsequently, a solution of 2-methylimidazole in DMF (0.5 mol/L) was prepared and supplied to the inner cavity of the porous support. The porous support was then left to stand for 72 hours. After drainage, the porous support was washed with methanol, and then dried, to obtain an uncombined membrane.

An aqueous solution of PHENIX-800 (manufactured by Kobe Rikagaku Kogyo Co., Ltd.), which is an alkaline phenolic resin prepolymer, was supplied to the outer surface of the uncombined membrane obtained, and methyl formate gas supplied to the hollow portion, to combine the phenolic resin by counter diffusion reaction. After drainage and degassing, the membrane was washed with water, and then dried, to obtain a gas separation membrane of Example 1.

As a result of evaluation of the gas separation membrane of Example 1 by the methods described above, the thickness of the gas separation functional layer was found to be 4.8 μm; the strength of the gas separation membrane during the module preparation step was found to be "excellent"; the presence ratio of the gas separation functional layer on one surface was found to be 97.6%; and the size of the composite compound on one surface was found to be 5.2 μm.

Twenty gas separation membranes of Example 1 were bundled together, and placed in an acrylic pipe (inner diameter, 15 mm) having an inlet. Both ends of the acrylic pipe were potted one by one by static potting using an epoxy resin. After curing of the epoxy resin, the potting site at one end was cut using a rotary saw to open the gas separation membranes, to obtain a gas separation membrane module.

As a result of evaluation of the gas separation membrane module of Example 1 by the methods described above, the strength of the gas separation membrane during the use of the module was found to be "excellent", and the distance between vicinal composite membranes was found to be 1,800 μm. The configuration and the properties of the composite membrane, and the property of the gas separation membrane module, are shown in Table 1.

TABLE 1

| | | | Example 1 | Example 2 | Example 3 | Example 4 | Example 5 | Comparative Example 1 | Comparative Example 2 |
|---|---|---|---|---|---|---|---|---|---|
| Composite Membrane | Raw Material of Support | | Alumina | Porous Carbon | Porous Carbon | Porous Carbon | Alumina | Alumina | Porous Carbon |
| | Raw Material of Gas Separation Functional Layer | | ZIF-8 | Carbon | Carbon | Carbon | Silicone | ZIF-8 | Carbon |
| | Thickness of Gas Separation Functional Layer | μm | 4.8 | 1.5 | 1.5 | 1.5 | 7.2 | 4.8 | 1.5 |
| | Presence Ratio of Gas Separation Functional Layer on at Least One Surface of Gas Separation Membrane | % | 97.6 | 90.8 | 92.4 | 91.0 | 90.5 | 100 | 100 |
| | Different Compound other than Compound Constituting Gas Separation Functional Layer (Composite Compound) | | Phenol Resin | Silica | Urethan Resin | Urethan Resin | Silica | absent | absent |
| | Size of Composite Compound at the Surface of Gas Separation Membrane | μm | 5.2 | 1.8 | 6.4 | 9.3 | 12 | absent | absent |
| Distance between Vicinal Composite Membranes of Gas Separation Membrane Module | | μm | 1,800 | 70 | 70 | 70 | 1,800 | 1,800 | 70 |

Production Example 1

Ten parts by weight of a polyacrylonitrile (PAN) (MW, 150,000) manufactured by Polysciences, Inc., 10 parts by weight of a polyvinyl pyrrolidone (PVP) (MW, 40,000) manufactured by Sigma-Aldrich, and 80 parts by weight of a dimethyl sulfoxide (DMSO) manufactured by FUJIFILM Wako Pure Chemical Corporation were mixed together, and the resulting mixture stirred at 100° C. to prepare a spinning solution. The resulting spinning solution was allowed to cool to 25° C. A concentric triple spinneret was then used to discharge 80 wt % aqueous DMSO solution, the spinning solution, and 90 wt % aqueous DMSO solution from the inner tube, the middle tube, and the outer tube, respectively, at the same time. Thereafter, the yarn was guided into a coagulation bath composed of pure water at 25° C., and then wound onto a roller, to obtain a yarn. The yarn obtained was washed with water, and then dried, to prepare a precursor of a carbon membrane having a hollow fiber shape.

The precursor of the carbon membrane obtained was passed through an electric furnace at 250° C., and heated for 1 hour in an air atmosphere to perform infusibilization treatment, to obtain an infusibilized yarn. Subsequently, the infusibilized yarn was subjected to carbonization treatment at a carbonization temperature of 650° C., to obtain an uncombined membrane having an outer diameter of 300 μm and an inner diameter of 100 μm as Production Example 1. The uncombined membrane of Production Example 1 comprises a porous carbon support and a gas separation functional layer composed of carbon.

Example 2

Tetramethoxysilane gas was supplied to the outer surface of the uncombined membrane obtained by Production Example 1, and oxygen gas supplied to the hollow portion of the membrane, followed by allowing the counter diffusion reaction to proceed at 600° C., to combine silica. After degassing, the membrane was washed with methanol, and then dried, to obtain a gas separation membrane of Example 2.

As a result of evaluation of the gas separation membrane of Example 2 by the methods described above, the thickness of the gas separation functional layer was found to be 1.5 µm; the strength of the gas separation membrane during the module preparation step was found to be "good"; the presence ratio of the gas separation functional layer on one surface was found to be 90.8%; and the size of the composite compound on one surface was found to be 1.8 µm.

One hundred gas separation membranes of Example 2 were bundled together, and placed in an acrylic pipe (inner diameter, 5 mm) having an inlet. Both ends of the acrylic pipe were potted one by one by static potting using an epoxy resin. After curing of the epoxy resin, the potting site at one end was cut using a rotary saw to open the gas separation membranes, to obtain a gas separation membrane module.

As a result of evaluation of the gas separation membrane module of Example 2 by the methods described above, the strength of the gas separation membrane during the use of the module was found to be "excellent", and the distance between vicinal composite membranes was found to be 70 µm. The configuration and the properties of the composite membrane, and the property of the gas separation membrane module, are shown together in Table 1.

Example 3

A urethane resin prepolymer that is a mixed solution of equal amounts of the phenolic compound solution CB-PTS (manufactured by ASAHI YUKIZAI CORPORATION) and the polyisocyanate solution CB-MTS (manufactured by ASAHI YUKIZAI CORPORATION) was prepared, and then supplied to the outer surface of the uncombined membrane obtained by Production Example 1. Subsequently, triethylamine gas for curing the urethane resin prepolymer was supplied to the hollow portion of the uncombined membrane obtained by Production Example 1, to combine the urethane resin by counter diffusion reaction. After drainage and degassing, the membrane was washed with methanol, and then dried, to obtain a gas separation membrane of Example 3.

As a result of evaluation of the gas separation membrane of Example 3 by the methods described above, the thickness of the gas separation functional layer was found to be 1.5 µm; the strength of the gas separation membrane during the module preparation step was found to be "excellent"; the presence ratio of the gas separation functional layer on one surface was found to be 92.4%; and the size of the composite compound on one surface was found to be 6.4 µm.

One hundred gas separation membranes of Example 3 were bundled together, and placed in an acrylic pipe (inner diameter, 5 mm) having an inlet. Both ends of the acrylic pipe were potted one by one by static potting using an epoxy resin. After curing of the epoxy resin, the potting site at one end was cut using a rotary saw to open the gas separation membranes, to obtain a gas separation membrane module of Example 3.

As a result of evaluation of the gas separation membrane module of Example 3 by the methods described above, the strength of the gas separation membrane during the use of the module was found to be "excellent", and the distance between vicinal composite membranes was found to be 70 µm. The configuration and the properties of the composite membrane, and the property of the gas separation membrane module, are shown together in Table 1.

Example 4

One hundred uncombined membranes of Production Example 1 were bundled together, and placed in an acrylic pipe (inner diameter, 5 mm) having an inlet. Both ends of the acrylic pipe were potted one by one by static potting using an epoxy resin. After curing of the epoxy resin, the potting site at one end was cut using a rotary saw to open the uncombined membranes, to prepare a membrane module.

A urethane resin prepolymer that is a mixed solution of equal amounts of the phenolic compound solution CB-PTS (manufactured by ASAHI YUKIZAI CORPORATION) and the polyisocyanate solution CB-MTS (manufactured by ASAHI YUKIZAI CORPORATION) was prepared, and then supplied from the inlet of the membrane module obtained as described above, to fill the outer surface of the uncombined membrane with the CB-PTS/CB-MTS solution. Subsequently, triethylamine gas for curing the urethane resin prepolymer was supplied to the hollow portion of the uncombined membrane of the membrane module, to combine the urethane resin by counter diffusion reaction. After drainage and degassing, the membrane was washed with methanol, and then dried, to obtain a gas separation membrane module of Example 4.

As a result of evaluation of the gas separation membrane module of Example 4 by the methods described above, the strength of the gas separation membrane during the use of the module was found to be "excellent"; the ratio of the gas separation functional layer on the surface of the gas separation membrane was found to be 91.0%; the size of the composite compound on one surface was found to be 9.3 µm; and the distance between vicinal composite membranes was found to be 70 µm. The configuration and the properties of the composite membrane, and the property of the gas separation membrane module, are shown together in Table 1.

Example 5

As a porous support, alumina having an average pore size of 100 nm to 250 nm, an outer diameter of 2 mm, and a length of 10 cm was used. On the surface, a silicone membrane was formed as a gas separation functional layer. Regarding the method of forming the silicone membrane, a solution of the silicone Sylgard 184 (manufactured by Dow Toray Co., Ltd.) in hexane (30 wt %) was prepared, and this was supplied to the outer surface of the porous support, followed by drying to obtain an uncombined membrane.

A sodium silicate solution (manufactured by FUJIFILM Wako Pure Chemical Corporation) was supplied to the outer surface of the uncombined membrane obtained, and carbon dioxide gas was supplied to the hollow portion of the membrane, to combine silica by counter diffusion reaction. After drainage and degassing, the membrane was washed with water, and then dried, to obtain a gas separation membrane of Example 5.

As a result of evaluation of the gas separation membrane of Example 5 by the methods described above, the thickness of the gas separation functional layer was found to be 7.2 μm; the strength of the gas separation membrane during the module preparation step was found to be "excellent"; the presence ratio of the gas separation functional layer on one surface was found to be 90.5%; and the size of the composite compound on one surface was found to be 12 μm.

Twenty gas separation membranes of Example 5 were bundled together, and placed in an acrylic pipe (inner diameter, 15 mm) having an inlet. Both ends of the acrylic pipe were potted one by one by static potting using an epoxy resin. After curing of the epoxy resin, the potting site at one end was cut using a rotary saw to open the gas separation membranes, to obtain a gas separation membrane module.

As a result of evaluation of the gas separation membrane module of Example 5 by the methods described above, the strength of the gas separation membrane during the use of the module was found to be "excellent", and the distance between vicinal composite membranes was found to be 1800 μm. The configuration and the properties of the composite membrane, and the property of the gas separation membrane module, are shown together in Table 1.

Comparative Example 1

As a porous support, alumina having an average pore size of 100 nm to 250 nm, an outer diameter of 2 mm, and a length of 10 cm was used. On the surface, ZIF-8 was synthesized as a gas separation functional layer. Regarding the method of synthesizing ZIF-8, a solution of zinc nitrate hexahydrate in methanol (0.4 mol/L) was prepared, and the solution supplied to the outer surface of the porous support. Subsequently, a solution of 2-methylimidazole in DMF (0.5 mol/L) was prepared and supplied to the inner cavity of the porous support. The porous support was then left to stand for 72 hours. After drainage, the porous support was washed with methanol, and then dried, to obtain an uncombined membrane of Comparative Example 1.

As a result of evaluation of the uncombined membrane of Comparative Example 1 by the methods described above, the thickness of the gas separation functional layer was found to be 4.8 μm; the strength of the gas separation membrane during the module preparation step was found to be "good"; and the presence ratio of the gas separation functional layer on one surface was found to be 100%.

Twenty gas separation membranes of Comparative Example 1 were bundled together, and placed in an acrylic pipe (inner diameter, 15 mm) having an inlet. Both ends of the acrylic pipe were potted one by one by static potting using an epoxy resin. After curing of the epoxy resin, the potting site at one end was cut using a rotary saw to open the gas separation membranes, to obtain a gas separation membrane module of Comparative Example 1.

As a result of evaluation of the gas separation membrane module of Comparative Example 1 by the methods described above, the strength of the gas separation membrane during the use of the module was found to be "poor", and the distance between vicinal composite membranes was found to be 1,800 μm. The configuration and the properties of the composite membrane, and the property of the gas separation membrane module, are shown together in Table 1.

Comparative Example 2

Ten parts by weight of a polyacrylonitrile (PAN) (MW, 150,000) manufactured by Polysciences, Inc., 10 parts by weight of a polyvinyl pyrrolidone (PVP) (MW, 40,000) manufactured by Sigma-Aldrich, and 80 parts by weight of a dimethyl sulfoxide (DMSO) manufactured by FUJIFILM Wako Pure Chemical Corporation were mixed together, and the resulting mixture stirred at 100° C. to prepare a spinning solution.

The resulting spinning solution was allowed to cool to 25° C. A concentric triple spinneret was then used to discharge 80 wt % aqueous DMSO solution, the spinning solution, and 90 wt % aqueous DMSO solution from the inner tube, the middle tube, and the outer tube, respectively, at the same time. Thereafter, the yarn was guided into a coagulation bath composed of pure water at 25° C., and then wound onto a roller, to obtain a yarn. The yarn obtained was washed with water, and then dried, to prepare a precursor of a carbon membrane having a hollow fiber shape.

The precursor of the carbon membrane obtained was passed through an electric furnace at 250° C., and heated for 1 hour in an air atmosphere to perform infusibilization treatment, to obtain an infusibilized yarn. Subsequently, the infusibilized yarn was subjected to carbonization treatment at a carbonization temperature of 650° C., to obtain an uncombined membrane having an outer diameter of 300 μm and an inner diameter of 100 μm as Comparative Example 2.

As a result of evaluation of the uncombined membrane of Comparative Example 2 by the methods described above, the thickness of the gas separation functional layer was found to be 1.5 μm; the strength of the gas separation membrane during the module preparation step was found to be "poor"; and the presence ratio of the gas separation functional layer on one surface was found to be 100%.

One hundred uncombined membranes of Comparative Example 2 were bundled together, and placed in an acrylic pipe (inner diameter, 5 mm) having an inlet. Both ends of the acrylic pipe were potted one by one by static potting using an epoxy resin. After curing of the epoxy resin, the potting site at one end was cut using a rotary saw to open the gas separation membranes, to obtain a gas separation membrane module of Comparative Example 2.

As a result of evaluation of the gas separation membrane module of Comparative Example 2 by the methods described above, the strength of the gas separation membrane during the use of the module was found to be "poor", and the distance between vicinal composite membranes was found to be 70 μm. The configuration and the properties of the composite membrane, and the property of the gas separation membrane module, are shown together in Table 1.

INDUSTRIAL APPLICABILITY

Our gas separation membrane module is capable of suppressing damage of the gas separation functional layer during the use of the gas separation membrane module, without deteriorating the permeability to the permeating gas. Although the use of the module is not limited, the module may be preferably used for uses such as a system for separation/storage of carbon dioxide from an exhaust of a power plant, blast furnace, or the like, removal of sulfur components from a gasified fuel gas in the integrated coal gasification combined cycle, purification of a biogas or natural gas, and hydrogen purification from an organic hydride.

The invention claimed is:

1. A gas separation membrane comprising a composite membrane, the composite membrane comprising:
   a gas separation functional layer; and
   a composite compound different from a compound constituting the gas separation functional layer,
wherein a compound constituting the gas separation functional layer is an inorganic compound,
wherein a presence ratio of the gas separation functional layer at at least one surface of the gas separation membrane is not less than 90.0% and less than 100%.

2. The gas separation membrane according to claim 1, wherein
   the composite membrane is placed on at least one surface of the gas separation membrane;
   a support is placed on another surface; and
   the presence ratio of the gas separation functional layer on the at least one surface is not less than 90.0% and less than 100%.

3. The gas separation membrane according to claim 2, wherein the support is a porous support.

4. The gas separation membrane according to claim 1, wherein
   the gas separation membrane is a hollow fiber membrane, and
   an inner diameter of the composite membrane is 10 μm to 2,000 μm.

5. The gas separation membrane according to claim 1, wherein a size of at least part of the composite compound is 0.1 μm to 100 μm on the surface of the gas separation membrane.

6. The gas separation membrane according to claim 1, wherein
   the composite compound is an organic compound.

7. The gas separation membrane according to claim 1, wherein the composite compound is one or more compounds selected from the group consisting of silica, phenolic resins, and urethane resins.

8. The gas separation membrane according to claim 1, wherein thickness of the gas separation functional layer is 0.01 μm to 10 μm.

9. A gas separation membrane module in which the gas separation membrane according to claim 1 is placed, wherein a distance between vicinal composite membranes is 10 μm to 2,000 μm.

10. A method of producing a gas separation membrane comprising a composite membrane, the composite membrane comprising:
    a gas separation functional layer; and
    a composite compound different from a compound constituting the gas separation functional layer, wherein the composite compound is formed by counter diffusion reaction, the method comprising:
    passing a gas or solution as a substrate of the composite compound, into a space separated by a membrane comprising an uncombined membrane; and
    passing a gas that cures the gas or solution as the substrate of the composite compound, into another space separated by the uncombined membrane.

11. The method of producing a gas separation membrane according to claim 10, wherein the gas separation membrane is a hollow fiber membrane, and an inner diameter of the composite membrane is 10 μm to 2,000 μm.

12. The method of producing a gas separation membrane according to claim 10, wherein a compound constituting the gas separation functional layer is an inorganic compound, and the composite compound is an organic compound.

* * * * *